(12) United States Patent
Lane et al.

(10) Patent No.: US 8,041,161 B1
(45) Date of Patent: Oct. 18, 2011

(54) ADAPTIVE PHOTONIC COUPLER

(75) Inventors: Steven A. Lane, Albuquerque, NM (US); Charles Collier, Albuquerque, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 769 days.

(21) Appl. No.: 12/169,694

(22) Filed: Jul. 9, 2008

(51) Int. Cl.
*G02B 6/26* (2006.01)
*G02B 6/42* (2006.01)

(52) U.S. Cl. ............. 385/31; 385/39; 385/52; 385/42

(58) Field of Classification Search .............. 385/23, 385/31, 33, 39, 42, 52
See application file for complete search history.

(56) References Cited

U.S. PATENT DOCUMENTS

| | | | |
|---|---|---|---|
| 4,572,616 A | 2/1986 | Kowel | |
| 5,071,253 A | 12/1991 | Chase | |
| 5,233,673 A | 8/1993 | Vali | |
| 6,128,421 A | 10/2000 | Roberts | |
| 6,597,836 B2 | 7/2003 | Johnson | |
| 6,748,141 B2 * | 6/2004 | Kennedy et al. | 385/49 |
| 7,068,891 B1 * | 6/2006 | Cook et al. | 385/52 |
| 7,079,203 B1 | 7/2006 | Huang | |
| 7,327,434 B1 | 2/2008 | Ren | |

* cited by examiner

*Primary Examiner* — Kevin S Wood
(74) *Attorney, Agent, or Firm* — Kenneth E. Callahan (57) ABSTRACT

A method to maximize the coupling efficiency between a collimated, free-space optical signal and a fiber optic waveguide using an active optical element to steer and focus the collimated beam driven by an adaptive controller that periodically auto-calibrates the active optical element's parameters to maximize the measured power received by the waveguide using a gradient ascent optimization algorithm.

4 Claims, 12 Drawing Sheets

ADAPTIVE PHOTONIC COUPLER

STATEMENT OF GOVERNMENT INTEREST

The conditions under which this invention was made are such as to entitle the Government of the United States under paragraph I(a) of Executive Order 10096, as represented by the Secretary of the Air Force, to the entire right, title and interest therein, including foreign rights.

BACKGROUND OF THE INVENTION

The invention relates generally to coupling between a collimated, free-space optical signal and a single-mode optical fiber, and in particular to optimizing the alignment and focus of an optical signal into a fiber core based on the measure of transmitted power in the fiber.

Although there have been many examples of active optical elements used in prior art for beam steering, adaptive lenses, and wavefront correction, the present invention is unique in its implementation, control approach simplicity, ability to correct dominant, low-order forms of wavefront error, and robustness. Some of the relevant prior art is discussed here to establish the novelty and utility of the current invention.

U.S. Pat. No. 4,572,616 by Kowel (issued in 1986) teaches an adaptive liquid crystal lens that can be electronically corrected for both internal and external aberrations. Kowel teaches that the refractive index of the liquid crystal device can be controlled to bring entering light to a focus upon exiting the device. It is claimed that the device can be made to exhibit characteristics of both a positive lens and a negative lens. Details of the control approach are not presented, except that a "control means" is used to drive the active optical element, with control signals being developed by "a processor in response to a given program" and "using well known microprocessor control techniques". To correct for aberrations, a feedback loop was incorporated to command the liquid crystal lens based on measurements from a photoelectric sensor positioned after the device at its image plane. In contrast, the present invention uses a more efficient measurement of optical power within the fiber to which it is coupled, an adaptive controller is used to maximize power transfer, and a model-based feedback loop is not required, which avoids controller stability issues.

U.S. Pat. No. 5,071,253 by Chase (issued in 1991) teaches a light beam position control system that utilizes Kerr cells and Lummer-Gehrcke plates to produce sets of optical phased linear arrays for beam positioning and beam monitoring. This device is for beam steering only, but illustrates a common shortcoming of prior art, that being an efficient feedback signal for controlling the active device. In a Kerr cell, the index of refraction of a material can be changed by applying an electric field. Chase teaches a light beam control system wherein the angular position of the "controlled" beam is monitored by measurement of the angular position of a second beam. The output of the active cells and plates is split into a primary and secondary beam, the secondary beam being interrogated and used to adjust the voltage applied to the active elements to result in precise control of the primary beam. Chase teaches that the controller includes an image analysis means, including a television camera and means for generating first and second control signals, or an optical interface maximum fringe counter and digital counting means for determining monitor (secondary) beam position. Obviously, analysis of the monitor (secondary) beam is complex and no account is given of how angular position of the primary beam can be inferred or is related to analysis of the secondary beam.

In contrast, the present invention uses a simpler and more robust approach for adaptively optimizing coupling with the fiber. Optical phased arrays require lower voltage levels than Kerr cells and Lummer-Gehrcke plates, and can be used for focusing a beam.

U.S. Pat. No. 5,233,673 by Vali (issued in 1993) relates to an optical phased array used to steer and focus an optical beam. However, instead of using a linear or planar optical phased array device to focus light energy into a fiber-optic, Vali teaches the use of an array of fiber-optic cables, wherein the relative phases along the optical paths are adjusted so that the light emitted from the fiber-optics is effectively focused. In contrast, the present invention uses an optical phased array device to focus light into a fiber-optic cable.

U.S. Pat. No. 6,128,421 by Roberts relates to beam steering using electro-optic phase modulators, optical phase array emitters, and electronic control circuits. Roberts states that a key problem with prior art approaches to electric beam steering is that control systems have been prohibitively complex. In contrast, the present invention uses a measurement of the optical power transmitted into the fiber to adaptively optimize the focal length and steered angle of the optical phased array. This allows tremendous flexibility, and the controller is able to compensate for dominant sources of wavefront error expected to be encountered during its service life.

U.S. Pat. No. 6,597,836 by Johnson teaches a control system for optical phased arrays that compensates for phase changes due to external perturbations such as vibration and thermal variations, as well as compensating for atmospheric aberrations external to the laser system. Johnson teaches an approach for compensating for wavefront errors as opposed to beam steering and focusing. Johnson uses analysis of the wavefront exiting the active device (that device being an optical phased array or phase modulator) to generate a control signal that is fed back to the active device. Johnson teaches that algorithms which are used in the known art to calculate phase measurements and corrections are computationally intensive, and therefore may not be capable of providing real-time feedback to the phase modulators. Johnson teaches the use of a personal computer or a plurality of personal computers to conduct analysis of the exiting beam to generate the necessary control signal. In contrast, the present invention does not require a measurement of the transmitted wavefront and subsequent analysis, which is prohibitively complex and computationally intensive. It will be shown that by maximizing the optical power transmitted into the fiber-optic, one is inherently compensating for the dominant modes of wavefront error, those being spherical aberration, tip, and tilt errors. Further, we avoid control stability issues by not using a feedback controller. Instead, an adaptive controller is used to make adjustments to the optical phased array in a feed-forward control architecture. This precludes the need to have an accurate system model for controller synthesis and allows for time-varying system dynamics.

U.S. Pat. No. 7,079,203 by Huang teaches an electronically tunable micro-lens device that uses an inhomogeneous, concentrated, polymer network with nematic liquid crystal. Huang asserts that micro-lenses are one of the most important components in the micro-optics field for optical fiber coupling. Huang teaches a gradient-index liquid crystal lens with a tunable focal length and low voltage requirements. The device is polarization independent, and capable of being used as either a positive or negative lens. Huang suggests implementation of the device in applications spanning optical communications, fiber-optic coupling, adaptive optics, wavefront error correction, and electronic beam steering, although no discussion of practical implementation or limitations is presented. U.S. Pat. No. 7,327,434 by Ren also teaches an electronically tunable lens device that uses uneven, homogenous liquid crystal droplets. Ren teaches a gradient-index liquid crystal lens with a tunable focal length, independent of polarization, and capable of being used as either a positive or negative lens. Such devices as taught by Huang and Ren are directly applicable to optical phased arrays that can be used for wavefront correction, beam steering, and adaptive lensing. These inventions are cited to demonstrate the progressing state-of-the-art in optical phased array devices. It is possible to achieve polarization-independent, variable focusing, and precision beam steering devices. There is clearly a need for an improved method of using such devices to optimize coupling of optical energy into an optical fiber, one that uses a simple and efficient adaptive control approach.

SUMMARY

The invention presents an approach and apparatus to improve coupling efficiency between a collimated, free-space, optical signal and a single-mode, optical fiber. An active optical element, such as a liquid crystal optical phased array, is used to steer and focus the collimated beam onto the optical fiber. An adaptive control loop is implemented to maintain optimal pointing and focusing. The controller only requires a relatively straightforward measurement of optical power. The controller corrects for low-order wavefront error (focus, tip, and tilt) in the collimated beam without computationally intensive analysis of wavefront sensor measurements. The control approach is relatively simple to implement and is robust to changes in system dynamics over time and operation.

DESCRIPTION OF THE PREFERRED EMBODIMENT

Introduction

Successful reception of photonic signals (i.e., laser light) over a free-space optical communications link depends on many factors, and the coupling of the free-space optical beam into a fiber-optic waveguide is particularly significant. Coupling refers to the transfer of photonic energy from one medium into another, such as from a free-space propagating laser beam into a fiber-optic waveguide used to transport the photonic signal to its destination. An inefficient or ineffective coupling mechanism can result in data-loss and reduced data transfer rates.

Figure 1:
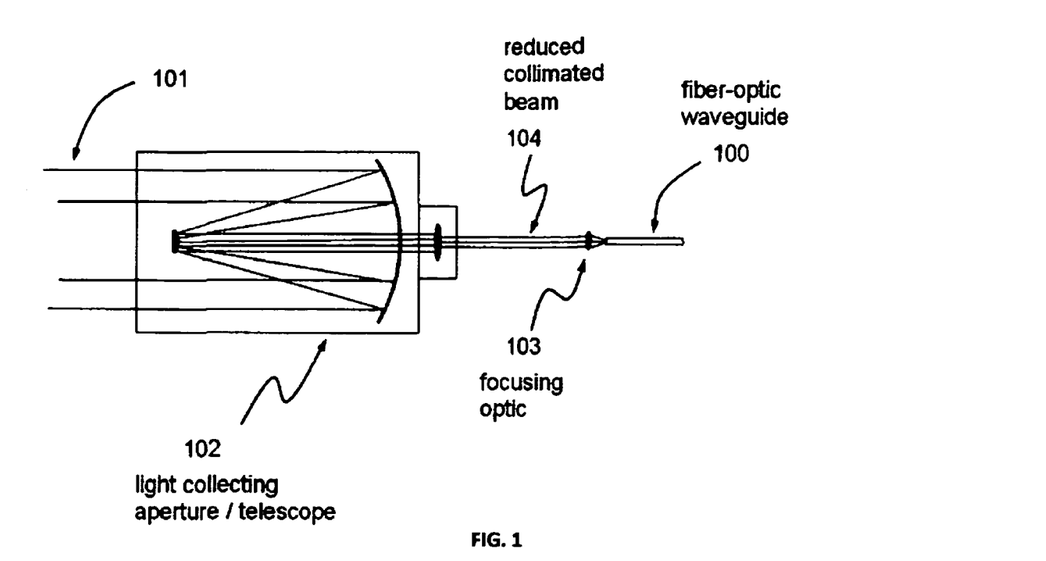
FIG. 1 is an illustration of free-space photonic signal to fiber coupling.

FIG. 1 is a schematic of how photonic signals 101 are coupled into a fiber-optic waveguide 100 (or single mode fiber) for the case of a laser communications (lasercom) receiver. In practice, a photonic signal (i.e., a laser beam propagating through free-space) is received by an optical aperture, such as a telescope 102. A large aperture may be used to capture the photonic signal if the signal is considered to be weak, as if from a distant or low power source. After the incident light is collected, it must be reduced to a diameter compatible with the fiber-optic waveguide as indicated 104. The focusing optic 103 must be designed to couple as much of the photonic energy (light) into the fiber-optic waveguide as possible. Once the signal is routed into a fiber-optic waveguide, it can then be routed to a data processing unit for relay or storage.

There are several phenomena that can reduce coupling efficiency, such as beam-walk, exceeding the maximum acceptance angle, and wavefront error. The performance of the optical transducer can be significantly reduced if these effects are not mitigated. For optimal coupling, it is necessary that the light beam be steered onto the center of the fiber-optic waveguide core. Beam-walk occurs if the transmitted beam moves about the center of the fiber core. If the center of the transmitted beam moves away from the center of the fiber core, some of the energy in the beam may be lost into the cladding, or simply not transmitted into the fiber core. Beam-walk can result from vibration or strain resulting from mechanical or thermal stresses in the terminal over time.

Figure 2:
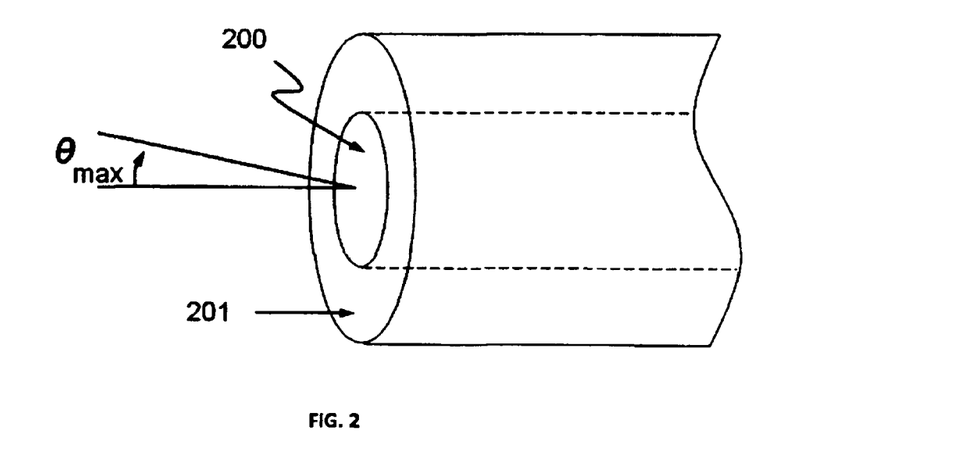
FIG. 2 is a schematic of a cladded single-mode optical fiber.

The conical angle of the incident light should be less than the maximum acceptance angle of the fiber-optic; else photonic energy will be lost into the core cladding. The maximum acceptance angle of a fiber-optic is defined as:

$$\theta_{max} = \sin^{-1}\left(\frac{\sqrt{n_{cr}^2 - n_{cl}^2}}{n_i}\right), \quad (1)$$

where $n_{cr}$ represents the index of refraction of the core 200 and $n_{cl}$ represents the index of refraction of the cladding 201 as indicated in FIG. 2. The parameter $n_i$ represents the index of refraction of the surrounding medium, which is defined as unity. If the incident light enters at an angle less than the maximum acceptance angle, then all light will be internally reflected along the fiber-optic.

Figure 3:
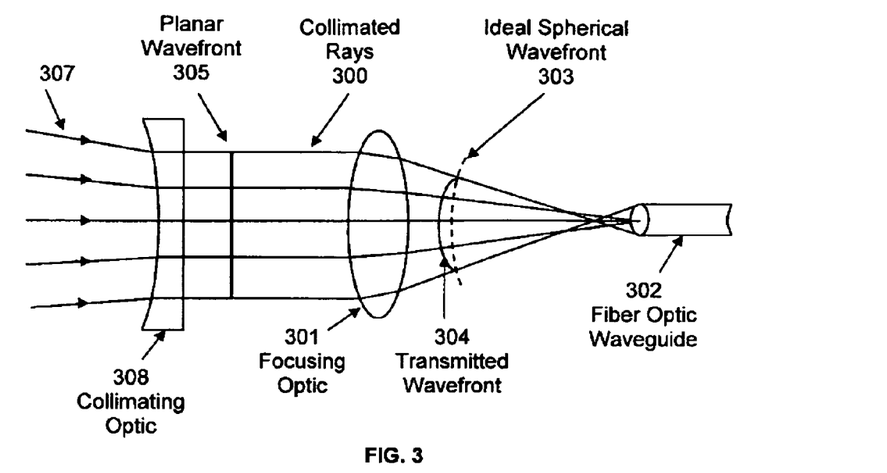
FIG. 3 illustrates a wavefront error in a propagating beam.

Wavefront error can reduce coupling with the fiber-optic waveguide as a result of focusing error or beam steering effects. Wavefront error is defined as deviation in the wavefront of the traveling light wave from the ideal or desired wavefront. Wavefront error can result from scintillation in the media through which the photonic signal propagates, or can originate at the transmission source. Even if the collected light beam has no wavefront error, imperfections in the beam train (i.e., optical elements) preceding the fiber-optic can introduce aberrations that create wavefront error. This is illustrated in FIG. 3. In FIG. 3, a collimated beam 300 is incident on a focusing optic 301. A light beam 307 is collimated if the light rays travel parallel to one another and with a planar wavefront 305, that is perpendicular to the direction of travel. The focusing optic 301 focuses the collimated beam onto the fiber-optic waveguide 302. Ideally, the transmitted light would have spherical wavefronts 303 that converge to a single focal point. However, in FIG. 3, the focusing optic has introduced some aberration. At a fixed radial distance from the desired focal point, the transmitted wavefront 304 (indicated with a solid line) is not spherical as desired, but instead varies with respect to a spherical wavefront 303 (indicated with a dashed line). This is wavefront error, and results in imperfect focusing. To prevent this, optics in the beam train 301 and 308 must be precisely manufactured, and alignment of the beam train optics (301 and 308) must be carefully controlled. Temperature variations can create thermal gradients along the beam train that result in stresses, which can induce strain-displacements. Such displacements can create non-uniform changes in the optical path length, which also produce focusing and wavefront errors.

Theory

Phase Delay in an Active Optical Device. For light, the optical path length (OPL) is the product of the distance traveled, d, and the index of refraction, n, of the medium through which it has traveled. This is expressed as:

$$OPL = nd. \quad (2)$$

The index of refraction through an active optical device can be varied by applying a voltage difference across the front and back planes of the device. The voltage induces a localized change in the index of refraction of the material contained within the device. An increase in the optical path length in one part of the device relative to the optical path length in an adjoining part of the device results in a "phase difference" between the wavefront of the light passing through different parts of the device.

Figure 4:
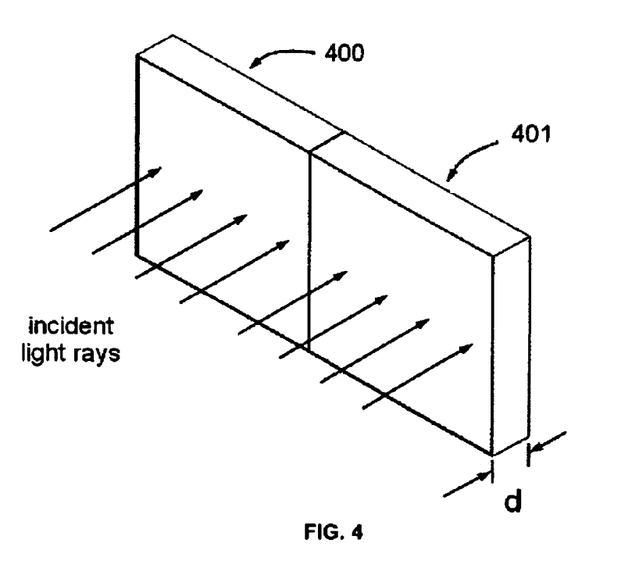
FIG. 4 is an illustration of optical path length difference.

To illustrate, consider the two-element planar device shown in FIG. 4. One element 400 has index of refraction, $n_1$, the other 401 has index of refraction, $n_2$, and each have thickness, d. The difference in the optical path lengths can be expressed as:

$$\Delta OPL = d(n_2 - n_1). \quad (3)$$

Multiplying by the wavenumber, $k = 2\pi/\lambda$ (where $\lambda$ is the wavelength), the phase difference (in radians) can be computed:

$$\Delta\phi = \left(\frac{2\pi d}{\lambda}\right)(n_2 - n_1). \quad (4)$$

Figure 5:
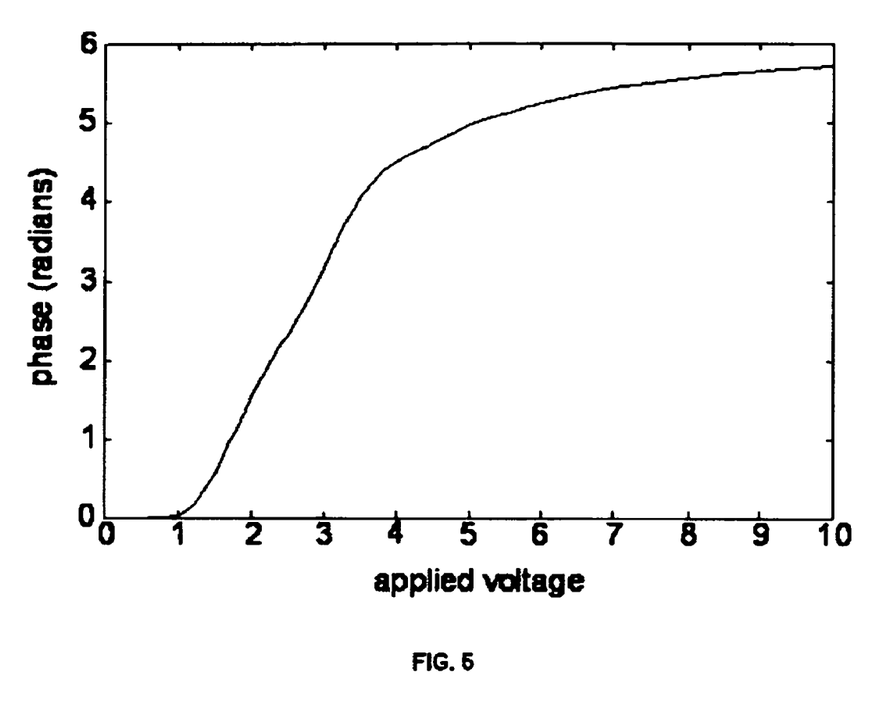
FIG. 5 is a plot showing the relation of phase delay and applied voltage for a liquid crystal active optical device.

FIG. 5 presents the relationship between applied voltage and resulting phase delay that is characteristic of some liquid crystal active optical devices.

Figure 6:
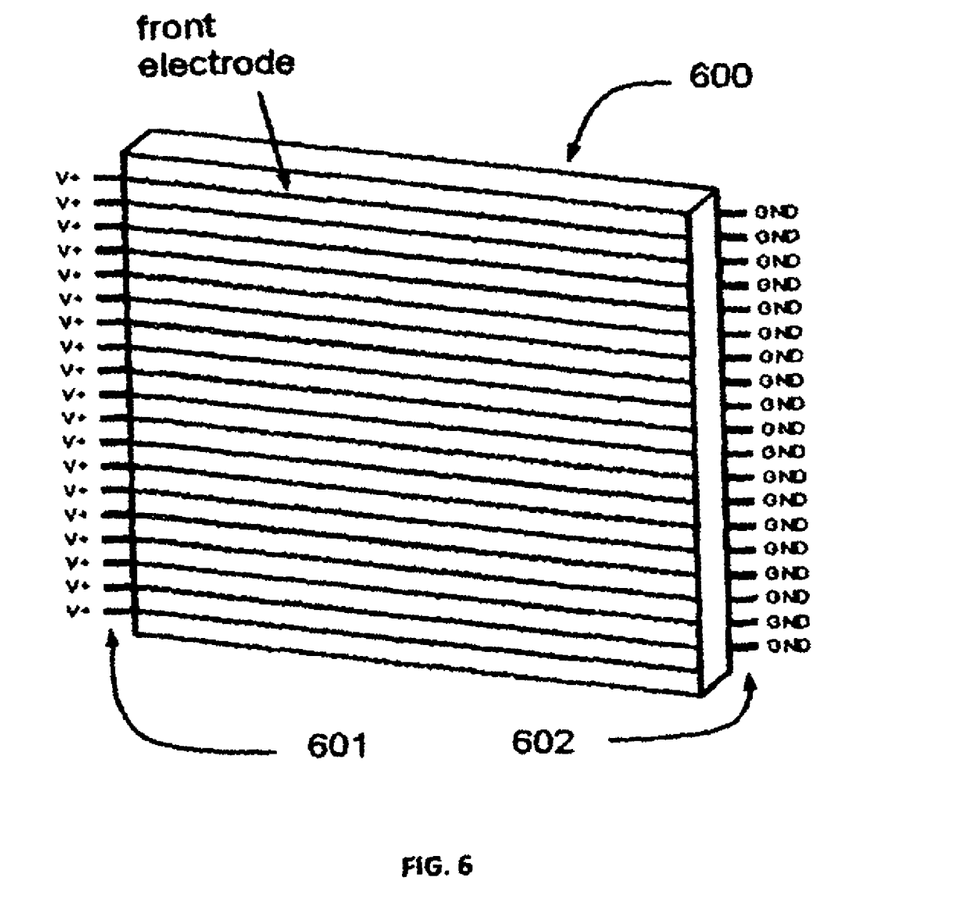
FIG. 6 depicts an optical phased array device.

An Optical Phase Array. By adding a series of finely spaced, transparent, conducting electrodes to both the front and back planes as shown in FIG. 6, and then applying a controlled spatial distribution of electrode voltages, a varying phase delay "profile" can be generated across the device. For simplicity FIG. 6 presents a rectangular aperture 600 with electrode 601 and 602 in a single direction (horizontal). In practice, these devices can have circular apertures, and a second layer of electrodes can be incorporated to facilitate beam steering or focusing in two dimensions (i.e., both horizontally and vertically). Alternatively, a second, cascaded, device rotated 90 degrees can be used to facilitate beam steering or focusing in two dimensions.

Figure 7:
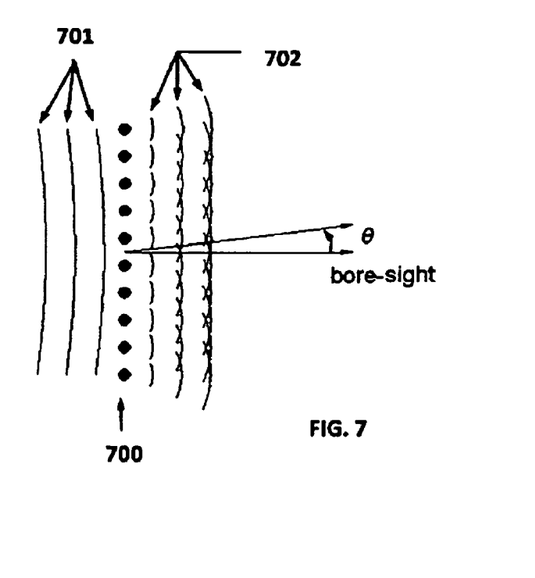
FIG. 7 shows an optical phased array modeled as an array of secondary emitters.
Figure 8:
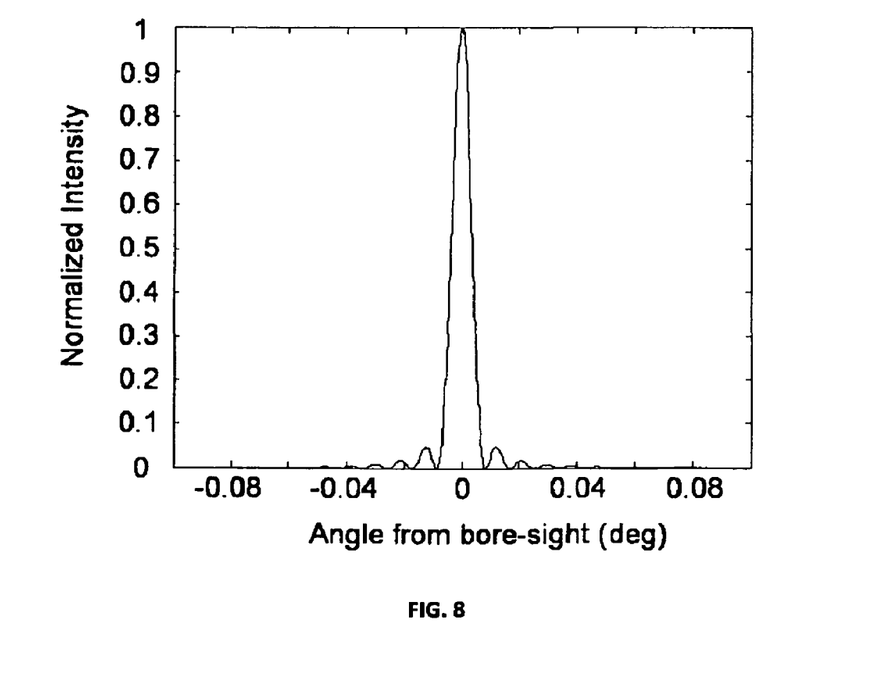
FIG. 8 is a plot of the bore-sight intensity for an optical phased array.

The device shown in FIG. 6 performs as a one-dimensional array of "secondary" emitters of electromagnetic waves in accordance with the Huygens-Fresnel theory (the Huygens-Fresnel theory suggests that every unobstructed point of a wavefront serves as a source for secondary spherical wavelets). As such, it can be modeled as a one-dimensional array of emitters as shown in FIG. 7. If the secondary emitters 700 radiate in-phase (i.e., coherently), then incident electromagnetic waves 701 will be re-radiated as shown 702 and constructively interfere with each other in the far-field (i.e., at a large distance from the array). This is an optical phased array. The intensity distribution within the diffraction pattern due to N coherent, identical, distant point sources in a linear array (as shown in FIG. 7) is given by the expression:

$$I(\delta) = I_0 \frac{\sin^2\left(\frac{N\delta}{2}\right)}{\sin^2\left(\frac{\delta}{2}\right)}, \quad (5)$$

where $I_0$ is the intensity of a single source. The parameter $\delta$ is defined by the phase of the re-radiated wavefronts 702 and for a given angle from bore-sight (direction perpendicular to the alignment of the radiators) defines the intensity pattern in the far-field. This parameter, $\delta$, can be expressed as:

$$\delta(\theta) = kd\sin(\theta), \quad (6)$$

where k is the wavenumber, $\theta$ is the angle from bore-sight, and d is the distance between each emitter 700. The normalized intensity distribution as a function of $\theta$ for N=10,000 is presented in FIG. 8 (k=4.2e6 m$^{-1}$; d=1e-6 m). The peak intensity at zero degrees is called the principal maximum (also known as the main-beam or main-lobe). As the number of emitters increases, the width of the principal maximum decreases.

Figure 9:
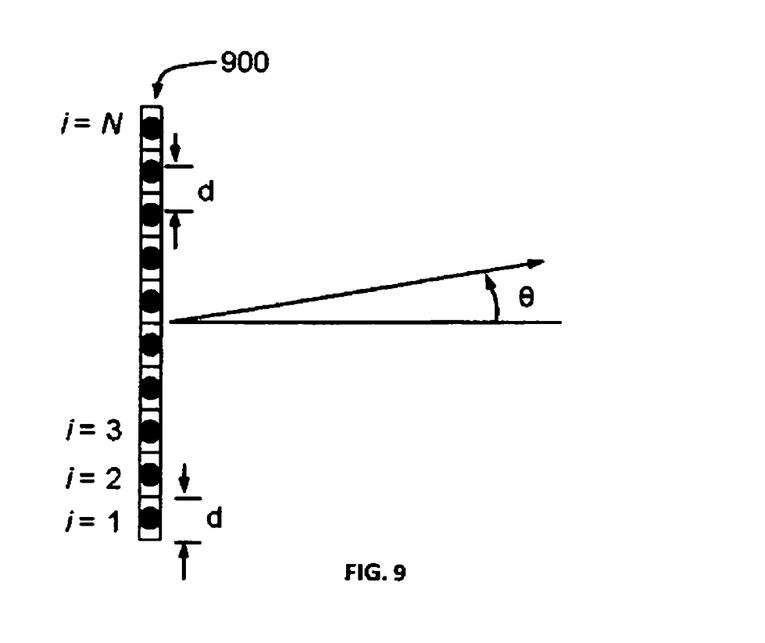
FIG. 9 shows an optical phased array modeled as an array of phase shifters.

Beam Steering with an Optical Phased Array. An optical phase array can also be modeled as an array of phase shifters, each phase shifter having width d, and a center-to-center distance between shifters of d (for simplicity) as shown in FIG. 9. If d<$\lambda$, then only one principal maximum will result from the device. Let the phase shifters 900 be numbered as i=1, 2, 3, . . . , N. A linear phase profile can be defined across the array so that the phase added by each array element, i, is given as:

$$\Phi(i) = (i-1)^*\phi, \quad (7)$$

where $\Phi$ is a constant phase shift in radians (this is defined so that there is no phase shift added at the first array element, i=1, for positive steering angles). Consequently, the expression for $\delta$ in Equation (6) becomes:

$$\delta(\theta) = kd\sin(\theta) + \phi. \quad (8)$$

Therefore, to steer the main-beam of the phased array to a desired angle, $\psi$, from bore-sight, it can be shown by simple geometry that:

$$\phi = kd\sin(\psi). \quad (9)$$

Figure 10:
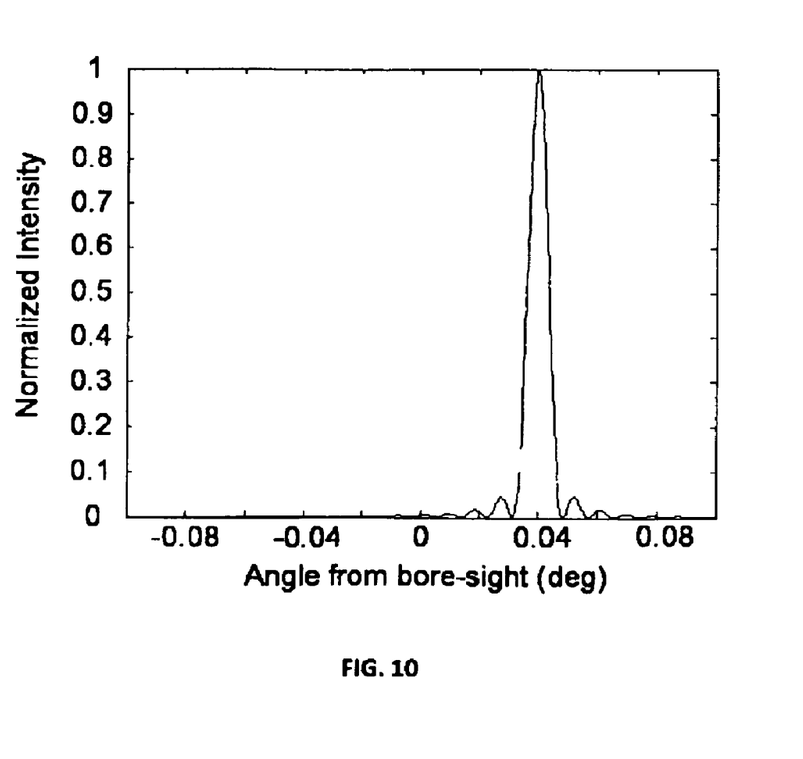
FIG. 10 is a plot of the steered intensity for an optical phased array.

The normalized intensity distribution as a function of θ for N=10,000 and ψ=0.04 degrees is presented in FIG. 10 (k=4.2e6 m$^{-1}$; d=1e-6 m). FIG. 10 shows that, indeed, the main-beam is steered to ψ=0.04 degrees as desired.

Figure 11:
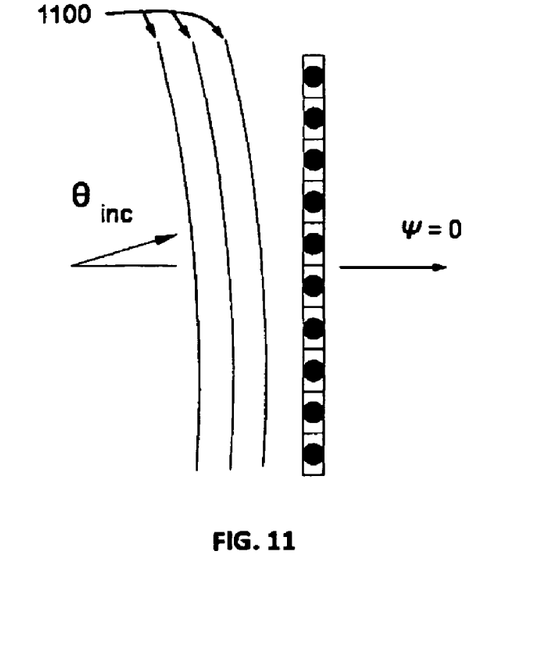
FIG. 11 shows an optical phased array steering with non-zero incident angle.
Figure 12:
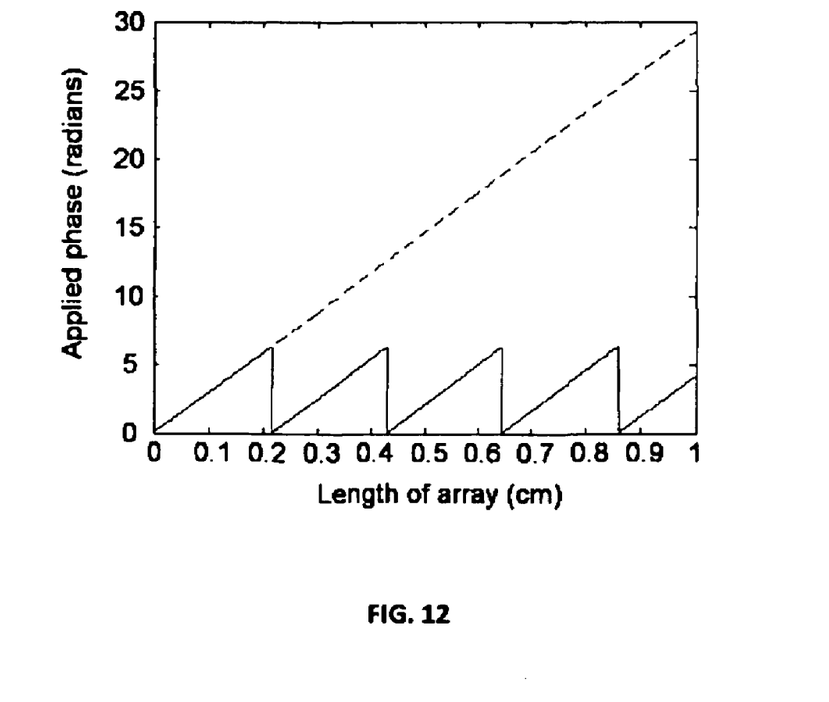
FIG. 12 shows the phase profile to correct for $\theta_{inc}$=0.04 degrees for an example optical phased array device.

This method of beam steering by phase shifting can be used to compensate for undesired tip or tilt of the incident wavefront. Consider for instance that the incident wavefront, 1100, has some tilt error that results in an incident angle θ$_{inc}$=0.04 degrees as depicted in FIG. 11. Suppose that it is desired to point the transmitted beam to ψ=0.0 degrees. For a 1-cm device with k=4.2e6 m$^{-1}$ and d=1e-6 m, the necessary phase delay is: Φ=0.003 radians (using Equation (9)). The resulting phase profile across the device is shown in FIG. 12. The phase delay from i=1 to i=2 is 0.003 radians, which is a small fraction of a wavelength (0.04%). At element i=3, the added phase would be 0.006 radians. As shown in FIG. 12, the phase increases at a linear rate across the phased array (to nearly 30 radians) (dashed line). Since phase angle is circular, it repeats itself every 2π radians. Thus, it is equivalent to command the phase shifter to provide 0.003 radians, 0.003*(2π) radians, or 0.003 times any integer multiple of 2π. Consequently, one can compute the modulus between the phase angle and 2π, and let that be the commanded phase delay. This results in the "sawtooth" type phase profile shown in FIG. 12 with the solid line. In summary, with no phase delay provided by the device, the transmitted light beam will be at an angle equal to the incident angle. However, with an applied phase delay as shown in FIG. 12, the transmitted beam will be steered to 0 degrees, effectively compensating for the incident beam tilt.

Figure 13:
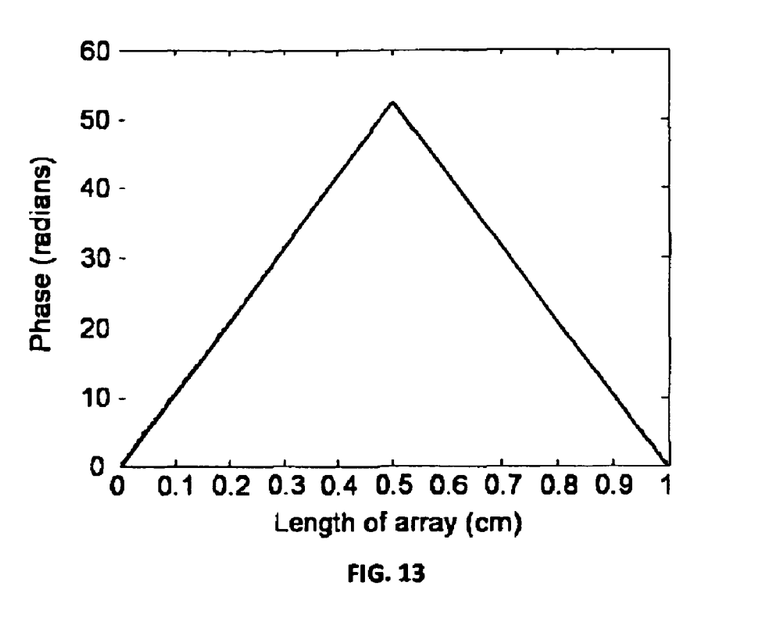
FIG. 13 is a plot of the phase profile for lensing example.
Figure 14:
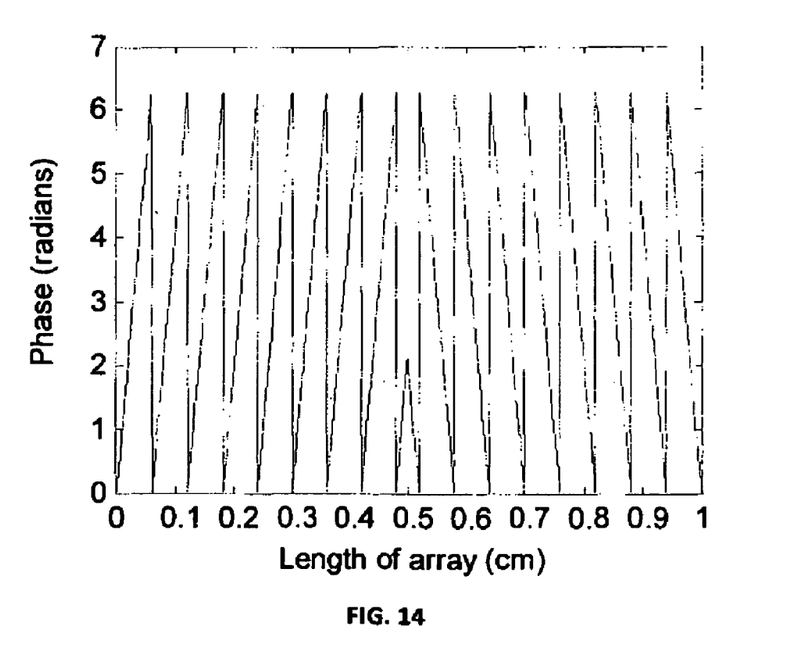
FIG. 14 is a plot of the phase profile modulus $2\pi$ for lensing example.

Lensing with an Optical Phased Array. The optical phased array can be used to provide lensing (i.e., beam focusing) in much the same method that beam steering was accomplished. For lensing, the optical phased array directs the transmitted beam so as to form a common focus point. Optical phased arrays have been used to generate both positive (real focus) and negative (virtual focus) lenses. This can be realized (to a first approximation) by considering the optical phased array as two devices, the first consisting of elements i=1, 2, ..., N/2 and having a first phase profile, and the second consisting of elements i=(N/2)+1, ... N and having a second, symmetric phase profile, each steering to a common point. Consider, for example, a one-dimensional optical phased array with length 1.0 cm separation between electrodes (i.e., phase shifter centers) of d=1e-6 m, and operating at a wavelength of λ=1.5e-6 m. FIG. 13 presents the computed phase profile across such device to result in a focus at 1 meter from the device (positive lens). The profile is symmetric about the center of the array. The phase profile modulus 2π is given in FIG. 14. As noted, this is a first-order approximation to the necessary phase profile, but is sufficient to demonstrate the concept. For a real device, the phase delay would vary radially from the center of the device in a nonlinear fashion.

If the phase profile for lensing is denoted as Φ$_L$(i), and the phase profile for steering is denoted as Φ$_S$(i), the two can be superimposed to steer the position of the focal point:

$$\Phi(i)=\Phi_L(i)+\Phi_S(i). \quad (10)$$

Figure 15:
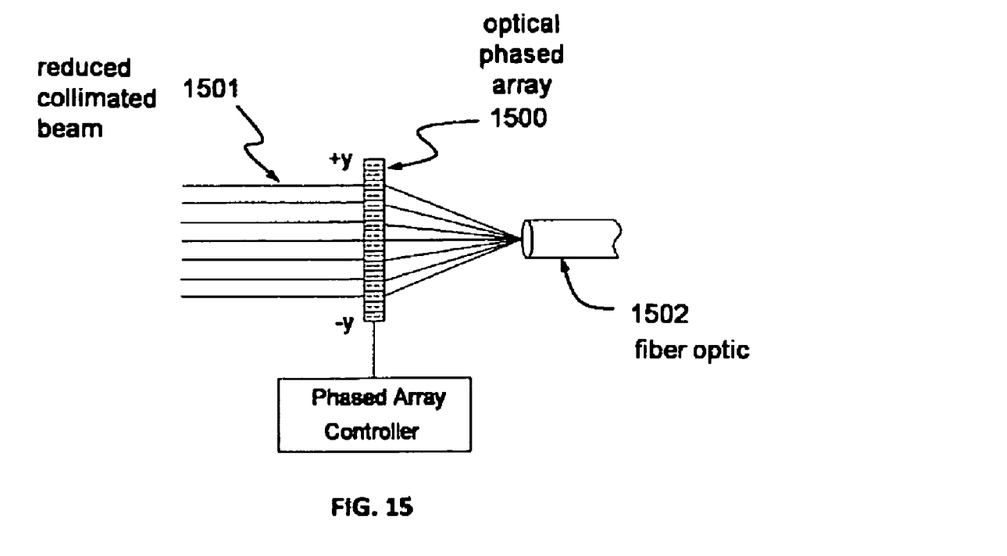
FIG. 15 is a schematic of open-loop focusing and pointing using an optical phased array device.

Adaptive Control of the Optical Phase Array. The objective of this invention is to couple optical energy into a fiber-optic waveguide as shown in FIG. 15. FIG. 15 presents a one-dimensional model of an optical phased array 1500 having only one dimension, that being length. The device spans from −y to +y, a total length of 2y. FIG. 15 depicts collimated light rays 1501 incident on the optical phased array, then being focused into a fiber-optic 1502. The electronics used to operate the device and generate the necessary phase profile and electrode voltages is represented in FIG. 15 as "Phased Array Controller". Control of an optical phased array is typically accomplished using an application specific integrated circuit. The example depicted in FIG. 15 is an open-loop system, which means that there is no means for establishing a feedback controller or adapting the optical phased array for variations in system configuration, operation, or performance. The present invention, illustrated in FIG. 16, proposes to implement a power sensor 1601 and adaptive controller 1600 to monitor the system for changes in performance and adjust the operation of the optical phased array through the phased array controller 1602 to maintain optimal coupling. This process will be referred to as auto-calibration.

Figure 16:
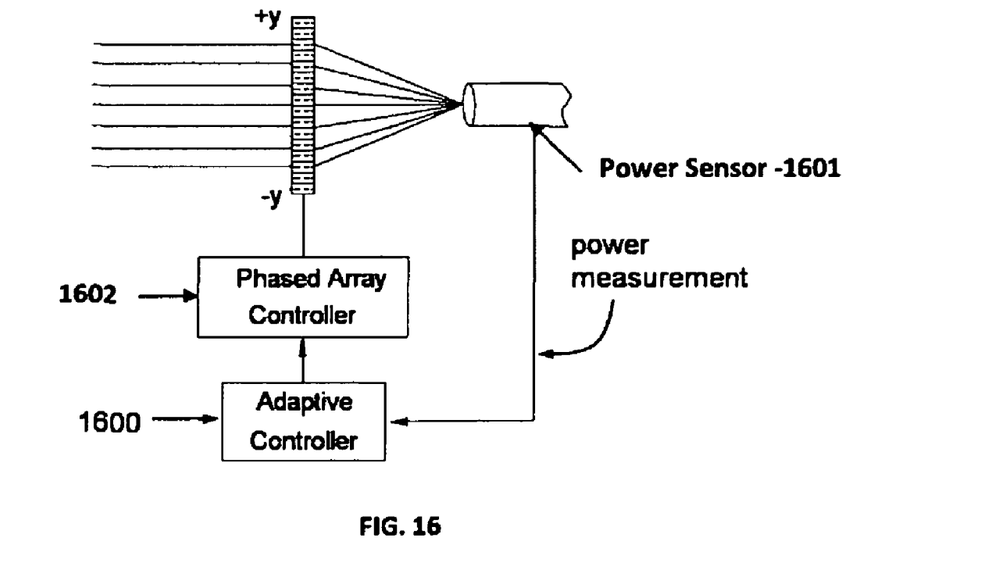
FIG. 16 is a schematic of a closed-loop adaptive control approach for optimal free-space to fiber coupling.

The adaptive controller 1600 adjusts three parameters that determine the phase profile of the optical phased array: 1) focal length, f; 2) azimuth steering angle, α; and 3) elevation steering angle, ε. It is desired to maximize the overall coupling efficiency, which can be defined as:

$$\zeta = \frac{P_{fiber}}{P_{free-space}} \quad (11)$$

where P$_{fiber}$ is the power received into the fiber-optic, and P$_{free-space}$ is the optical power of the free-space signal. The overall efficiency is between zero and unity. The optimal design point is the combination of focal length and steering angles that maximize coupling efficiency, which will be denoted as f*, α*, and ε*. Deviation from the optimal design point reduces the overall coupling efficiency. Such changes will be expressed as Δf, Δα, and Δε. It is the objective of the adaptive controller to drive Δf, Δα, and Δε to zero so that the system operates at f*, α*, and ε*.

Figure 17:
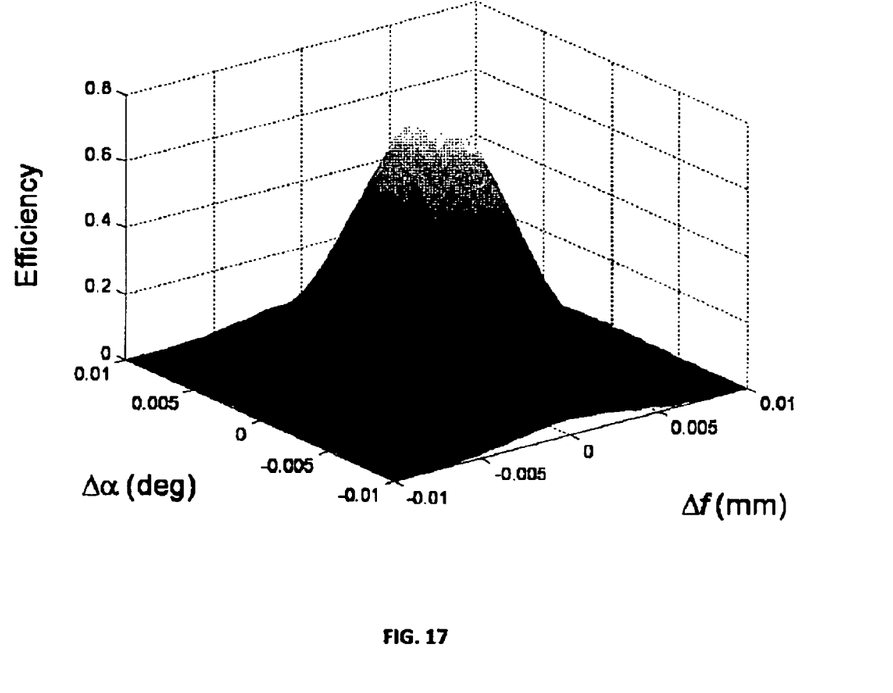
FIG. 17 is a plot of coupling efficiency as a function of focal length and steering angle.

From Equation (11), it is clear that maximizing P$_{fiber}$ implicitly maximizes ζ. The performance metric for the controller is defined to be the overall coupling efficiency, ζ, however, the sensed variable used by the adaptive algorithm will be P$_{fiber}$. FIG. 17 presents an approximation to the functional relationship between overall efficiency, changes in focal length, and steering angle for a nominal system design. Only one steering angle is presented due to the limitation of a three dimensional plot. At the optimal design point, the efficiency in this example is about 0.8 and rolls off with increasing deviation.

In practice, the system starts at a default design point, having some initial value for f, α, and ε. In the preferred embodiment, the adaptive controller periodically executes an auto-calibration cycle to adjust these parameters to the optimum design point, f*, α*, and ε*. Alternatively, the calibration cycle can be initiated if the measured performance drops below some threshold value.

The adaptive controller uses a gradient search, maximization algorithm, which is relatively simple and robust to implement. To explain the control algorithm, let the sampled performance metric be denoted as J$_k$, which is a discrete-time measurements of P$_{fiber}$, with the subscript k corresponding to the discrete-time index, not wavenumber. The performance metric will have the concave shape as the efficiency plotted in FIG. 17. At time index k, the current values of the three parameters will be denoted as: f$_k$, α$_k$, and ε$_k$. The adaptive controller first computes a numerical approximation to the first derivative (i.e., the gradient) of the performance metric with respect to each parameter. This can be accomplished by a variety of numerical techniques, such as the forward difference method:

$$\frac{\partial J}{\partial f} = \frac{J(f_k + \Delta h_f) - J(f_k)}{\Delta h_f} \quad (12)$$

$$\frac{\partial J}{\partial \alpha} = \frac{J(\alpha_k + \Delta h_\alpha) - J(\alpha_k)}{\Delta h_\alpha} \quad (13)$$

$$\frac{\partial J}{\partial \varepsilon} = \frac{J(\varepsilon_k + \Delta h_\varepsilon) - J(\varepsilon_k)}{\Delta h_\varepsilon} \quad (14)$$

where $\Delta h_f$, $\Delta h_\alpha$, and $\Delta h_\varepsilon$ are small perturbations about the current operating parameters sufficient in magnitude to yield an accurate estimate of the local value of the gradient. This provides information to the adaptive controller as to which direction the parameters should be adjusted to improve performance. In the preferred embodiment, the gradient vector is normalized to improve numerical robustness.

Figure 18:
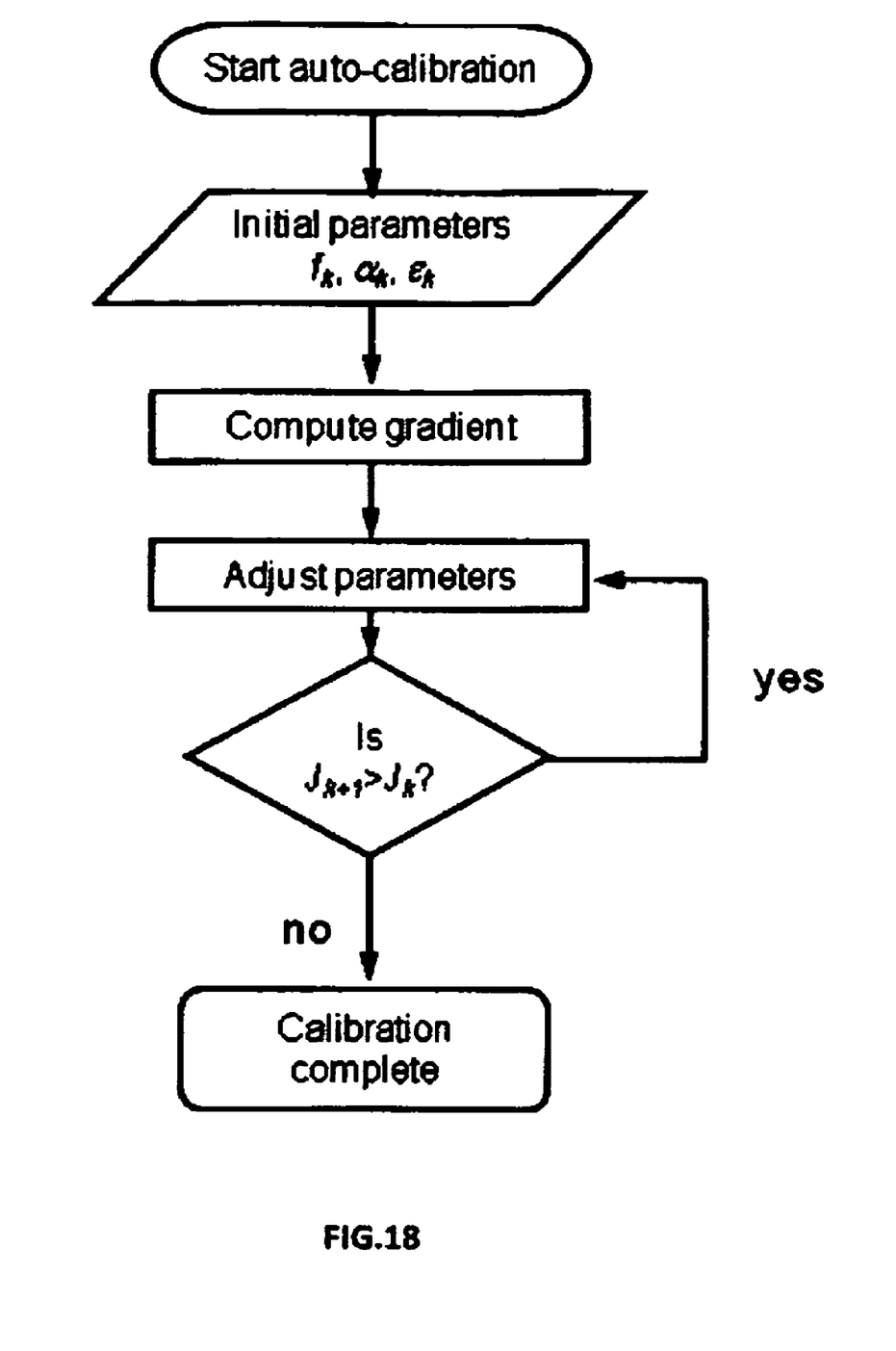
FIG. 18 is a flow diagram of the adaptive algorithm.

Once the gradient is computed, the parameters are then incrementally updated in the direction of the gradient for as long as the performance metric is improved, that is: $J_{k+1} > J_k$. This can be expressed as:

$$f_{k+1} = f_k + \mu \frac{\partial J}{\partial f} \quad (15)$$

$$\alpha_{k+1} = \alpha_k + \mu \frac{\partial J}{\partial \alpha} \quad (16)$$

$$\varepsilon_{k+1} = \varepsilon_k + \mu \frac{\partial J}{\partial \varepsilon} \quad (17)$$

where $\mu$ is the convergence parameter that determines the "step size" along the gradient towards the expected optimum. The auto-calibration cycle is complete when the maximum value of the performance metric has been found, in which case the three parameters would be near optimal. This is given in a flow-diagram form in FIG. 18.

Noise in the measured data can prevent accurate estimation of the performance metric and gradients. Therefore, systems with sensor noise must use time-averaging (i.e., averaging over many samples) to reduce the effects of sensor noise. Furthermore, additional steps must be included in the process depicted in FIG. 18. After apparent convergence in a computed gradient direction, the gradient must be recomputed. If the gradient is sufficiently small, which indicates convergence, the system is considered converged, and the calibration cycle is complete. Else, the parameters are incrementally updated along the new gradient direction.

Figure 19:
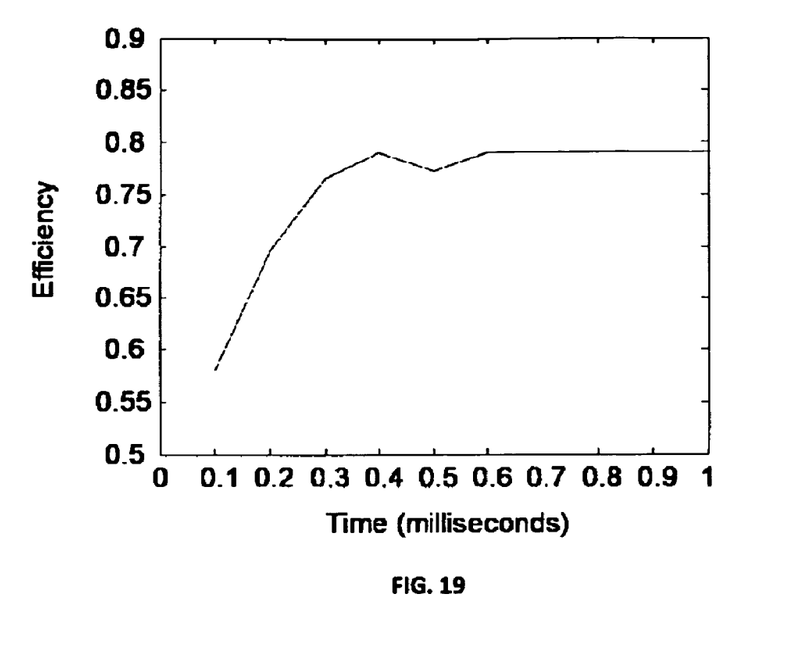
FIG. 19 is a plot illustrating adaptive controller optimization.

Control Simulation 1. To illustrate, consider the simple system with the performance function shown in FIG. 17 and optimal design point of f*=6.5 mm, α*=0.0°, and ε*=0.0°, which corresponds to an efficiency of 0.8. A sample rate of 10 kHz was assumed for this example to provide a time-line for the simulation. Now assume this system is subjected to an external disturbance that changes the optimal focal length by Δf=0.003 mm, and the optimal azimuth steering angle by Δα=0.002°. The gradient was computed and the parameters, f, α, and ε, were adapted to re-converge to the optimal design point as shown in FIG. 19. Essentially, the system adapted to compensate for the disturbance. In this example, only 13 iterations were required to adapt from an efficiency of 0.58 to 0.7911 (Δf→2.2e-5 mm and Δα→−1.4e-5°). Since ε was not perturbed in this example, the gradient about $\varepsilon_k$ was effectively zero, and therefore no changes were made to that parameter. No sensor noise was included in this example.

Wavefront Error Compensation. This example shows that the adaptive controller can adjust the parameters of the optical phased array to compensate for deviation in the operating parameters from the optimal design point, particularly the focal length and steering angle. Research in optical phased arrays has revealed that such devices are suitable for correcting optical aberrations that can be expressed using low-order Zernike polynomials. Zernike polynomials are an orthogonal set of basis functions that can be used to describe some optical aberrations. Zernike polynomials are nonlinear functions of the aperture radius and rotation angle about the aperture cross-section. The wavefront can be expressed as a weighted summation of the Zernike polynomial terms:

$$WFE = \sum_{m=0}^{M} w_m z_m, \quad (18)$$

where m is the order of the polynomial, and $w_m$ is the appropriate weighting coefficient. The first eight Zernike polynomials are listed in Table 1 (where ρ is the radial coordinate, θ is the rotation angle, and [X, Y] are orthogonal axis (horizontal and vertical)). Optical phased arrays are less effective for correcting higher order Zernike terms. Prior art techniques require interrogation of the wavefront error using imaging methods and computationally complex algorithms. The method demonstrated here corrects for the fundamental, dominant modes of aberration, those being tip, tilt, and focus. It is an advantage of this invention that this is accomplished using only a measurement of the optical power.

TABLE 1

Zernike polynomials often used to describe optical aberrations

| Zernike | Polynomial | Description |
|---|---|---|
| $z_0$ | 1 | Piston |
| $z_1$ | ρcos(θ) | Tilt X (tip) |
| $z_2$ | ρsin(θ) | Tilt Y (tilt) |
| $z_3$ | $-1 + 2\rho^2$ | Power (focus) |
| $z_4$ | $\rho^2\cos(2\theta)$ | Astigmatism X |
| $z_5$ | $\rho^2\sin(2\theta)$ | Astigmatism Y |
| $z_6$ | $\rho(-2 + 3\rho^2)\cos(\theta)$ | Coma X |
| $z_7$ | $\rho(-2 + 3\rho^2)\sin(\theta)$ | Coma Y |

Control Simulation 2. Consider the following simulation, which uses the same performance metric used in the previous example. This simulation included sensor noise (zero-mean, standard deviation of unity), which was added to the measurement of $P_{fiber}$. The quantity of added noise was defined in terms of the signal-to-noise (SNR) ratio, which was defined as the ratio of $P_{fiber}$ to the power of the added noise, $P_{noise}$, in terms of decibels. This is expressed as:

$$SNR = 10 \log_{10}\left(\frac{P_{fiber}}{P_{noise}}\right). \quad (19)$$

As a consequence of the added noise, the estimate of the performance function for a given parameter set, $J_k$, must be computed as the time-average of many measurements:

$$E[J_k] = \frac{1}{M}\sum_{m=1}^{M}(J_m + \upsilon_m), \quad (20)$$

were E[.] denotes the expected value operator, and M is the number of measurements (samples) averaged, and $v_m$ is the measurement noise. As M approaches infinity, the expected value of the noise approaches zero. The number of samples averaged in practice must be such that the computed estimate of the performance function is sufficiently accurate for the algorithm to converge. Thus, the number of samples and therefore the convergence time is dependent upon the signal-to-noise ratio. A sample frequency of 10 kHz, a signal to noise ratio of 40 dB, and M=10 were selected for this simulation.

Figure 20:
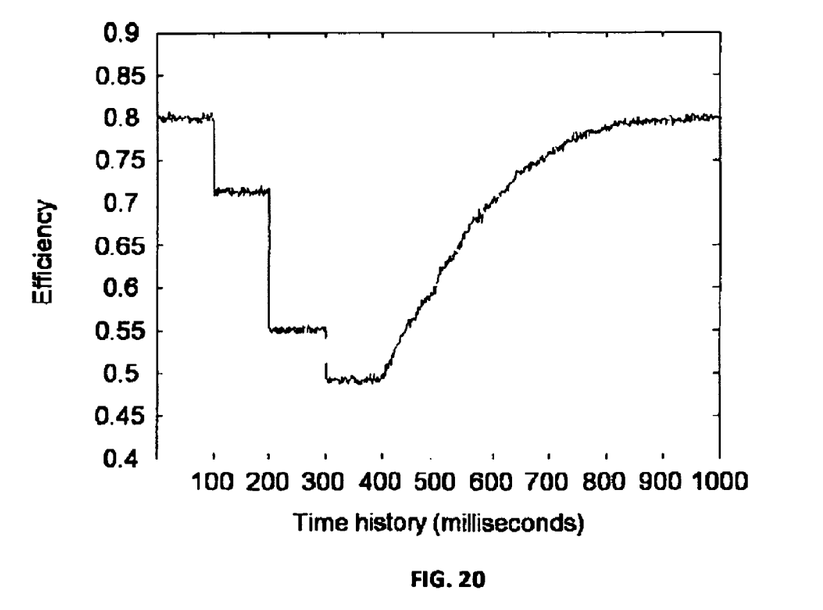
FIG. 20 is a plot illustrating adaptive controller optimization with noise.

Initially, the simulation started with no errors, yielding an efficiency of 0.8. At 100 ms, tip error (Zernike polynomial $z_1$) was introduced that resulted in 0.002 degrees of elevation error. The effect on efficiency can be seen in the time history given in FIG. 20. At 200 ms, a second tilt error (Zernike polynomial $z_2$) was introduced that resulted in 0.003 degrees of azimuth error. At 300 ms, a focus (or "power") error (Zernike polynomial $z_3$) was introduced that resulted in a change from the optimal focal length of −0.0015 mm. At 400 ms, a calibration cycle was initiated. In this simulation, the system re-converged by 1000 ms. Convergence was slowed by the added sensor noise.

This simulation suggests that the adaptive controller can adapt the phase profile of the optical phased array to correct for physical perturbations of the system (as seen in the first simulation) and correct for aberrations in the wavefront (as seen in the second simulation). Compensating for wavefront error did not require imaging or image analysis. Convergence rates were dependent upon the signal-to-noise ratio. No system models were required, and neither was there an explicit feedback loop.

In summary, the system is able to periodically optimize alignment and focus of the free-space optical signal into the fiber core using only a measure of transmitted power in the fiber. The adaptive controller does not require a model-based feedback controller, so it is easier to implement and more robust than the prior art. The adaptive controller compensates for time varying changes in the physical system that might result from mechanical stress, thermal stress, and vibration. The system can also compensate for wavefront errors that can be represented by low-order Zernike polynomials, which typically are the most significant factors in wavefront error. The wavefront compensation is accomplished without analysis of the transmitted wavefront; it is implicitly accomplished by maximization of power transmission.

A liquid crystal optical phased array is only one choice for the active optical element. Other types of devices may be used that comprise different materials. The system may or may not match the maximum acceptance angle defined by the single mode fiber which is believed to be the optimum embodiment. The system may be used for either space-based laser communication satellites, or terrestrial data transfer applications, although autonomous "self-calibration" would be more valuable for an on-orbit system, which cannot be manually corrected. As such, it would justify the additional cost and complexity of a self-calibrating, active optical system. For a space system, the lasercom terminal, optical elements, and fiber optic waveguides would be fabricated from space flight qualified materials, which may require an alternative active material instead of liquid crystal.

The invention claimed is:

1. A method for coupling free-space photonic signals with fiber optic waveguides using an adaptive controller that maximizes power transferred into said optic fiber by adjusting operating parameters of an active optical element, the method comprising:
 a) collecting, focusing, and steering an incident photonic energy beam into said optic fiber using an active optical element that controls the focal length, azimuth steering angle, and elevation steering angle of said incident beam;
 b) measuring the photonic energy received by said optic fiber;
 c) feeding said photonic energy measurement to an adaptive controller;
 d) periodically auto-calibrating said incident beam in said adaptive controller using a gradient ascent optimization algorithm to maximize the energy received by said optic fiber by adjusting the focal length and steering angles of said active optical element to the optimal design point determined in each auto-calibration cycle, whereby beam walk and wavefront error are periodically corrected.

2. The method of claim 1, wherein said auto-calibration is initiated whenever said measured energy drops below a designated threshold value.

3. The method of claim 1, wherein said active optical element is an optical phased array device in which steering azimuth and elevation and focal length of said incident photonic energy beam is periodically adjusted to said optimal design point by phase shifting of said beam.

4. The method of claim 3, wherein said auto-calibration is initiated whenever said measured energy drops below a designated threshold value.

* * * * *